United States Patent [19]
Okubo et al.

[11] Patent Number: 6,041,139
[45] Date of Patent: *Mar. 21, 2000

[54] IMAGE PROCESSING APPARATUS

[75] Inventors: Hiromi Okubo, Yokohama; Rie Ishii, Souka, both of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/664,492

[22] Filed: Jun. 17, 1996

[30] Foreign Application Priority Data

Jun. 16, 1995 [JP] Japan ................................. 7-150348

[51] Int. Cl.[7] ........................................ G06K 9/48
[52] U.S. Cl. ............................ 382/199; 358/534
[58] Field of Search .................... 382/199, 266, 382/274, 267, 268, 269; 358/519, 521, 534, 401

[56] References Cited

U.S. PATENT DOCUMENTS

| | | | |
|---|---|---|---|
| 4,648,120 | 3/1987 | Chittineni | 382/199 |
| 4,979,129 | 12/1990 | Okubo et al. | 345/431 |
| 5,257,116 | 10/1993 | Suzuki | 358/453 |
| 5,363,210 | 11/1994 | Sasaki et al. | 382/199 |
| 5,410,619 | 4/1995 | Fujisawa et al. | 382/254 |
| 5,572,603 | 11/1996 | Koike | 382/199 |
| 5,719,967 | 2/1998 | Selcine | 382/199 |

FOREIGN PATENT DOCUMENTS

| | | |
|---|---|---|
| 3-133895 | 8/1992 | Japan . |
| 4-229767 | 8/1992 | Japan . |

*Primary Examiner*—Amelia Au
*Assistant Examiner*—Samir Ahmed
*Attorney, Agent, or Firm*—Oblon, Spivak, McClelland, Maier & Neustadt, P.C.

[57] ABSTRACT

An image processing apparatus for improving the performance of reproducing an image edge and obtaining a preferable image output including an edge judging unit for judging the presence or absence of both left and right edge pixels of an input image. The apparatus further includes plural halftone processing units and a selection unit for selecting one of the plural halftone processing units based on a result of the judgment result of the presence or absence of either of the left or right edge pixel.

14 Claims, 9 Drawing Sheets

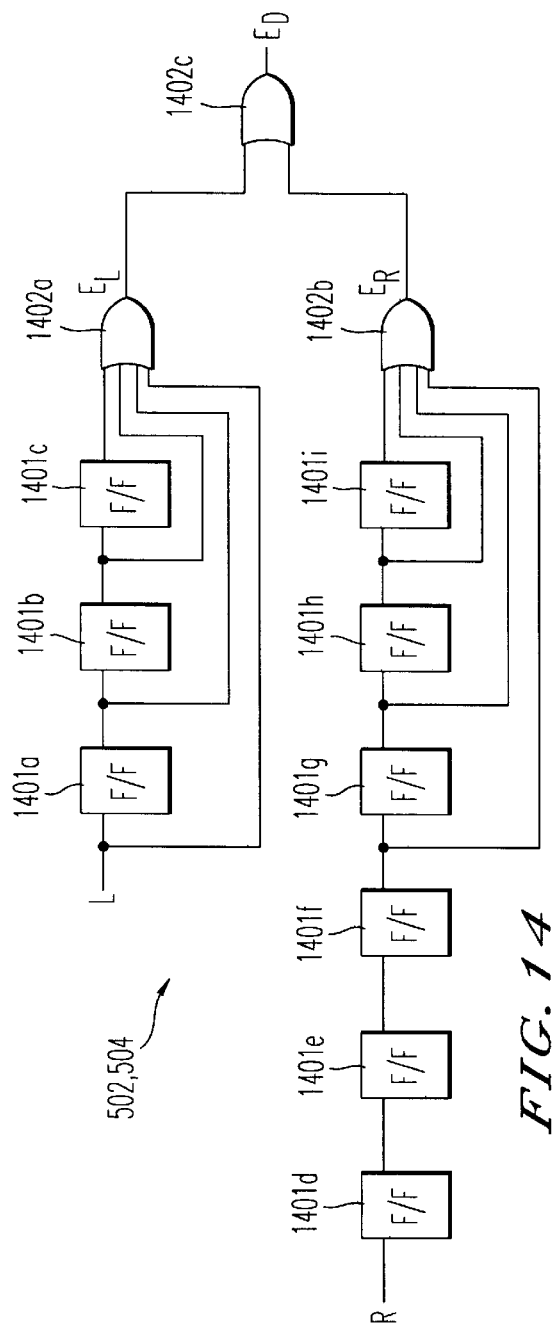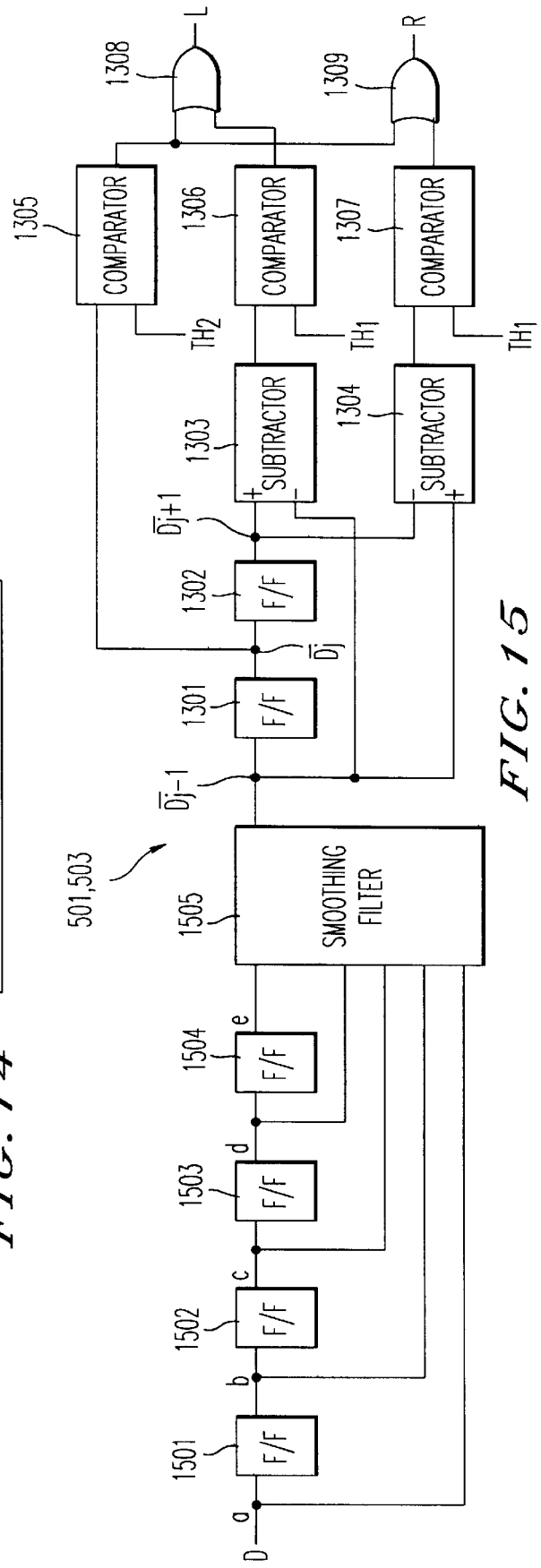
FIG. 14
FIG. 15

IMAGE PROCESSING APPARATUS

BACKGROUND OF THE INVENTION

1. Field of the Invention

The present invention relates to an image processing apparatus employed in a digital copying machine, a facsimile device, a scanner, or an image filing apparatus, etc., and in particular to an image processing apparatus which improves image quality in image reproduction.

2. Description of the Background Art

A background image processing apparatus is described in the published specification of Japanese Laid-open Patent Publication No. 4-0229767.

In this apparatus, image elements (pixels) as edge portions of an image at a beginning of the image in the main scanning direction are detected. That is, if an image is scanned in a left to right main scanning direction, in this apparatus image elements (pixels) as edge portions of the image at the left-side of the document being scanned are detected. After the edge portions are detected, processing of treatment can be performed on the edge portions to improve a quality of the image formation. However, such a background apparatus suffers from drawbacks in limiting the edge portions detected to the left-side edge portions.

SUMMARY OF THE INVENTION

One object of the present invention is to provide a novel image processing apparatus which solves the drawbacks in the background art.

In the background art, when detecting an edge pixel, only a left-side edge pixel of a character, line image, etc., is detected in the main scanning direction, while a right-side edge pixel thereof is not detected. As a result, an edge treatment of the edge pixel is practiced only for the left-side edge pixel. On the other hand, since the right-side edge pixel is not detected, an edge treatment is not practiced for the right-side edge pixel. This is a drawback to be overcome, and one feature of the present invention is to overcome such a drawback.

In this way, one object of the present invention to provide a novel image processing apparatus which is capable of improving the performance of reproducing an image edge, and particularly both edges at both sides of the image, and to thereby obtain a preferable image output.

It is still another object of the present invention to provide a novel image processing apparatus in which, in order to improve the image quality at both right and left edges of the image, an edge judging unit is provided for judging the presence or absence of an edge, and a selection of halftone processing units is changed in accordance with the judgment result.

It is still another object of the present invention to provide a novel image processing apparatus in which, in order to improve the image quality at both the right and left edges of the image in the main scanning direction, the edge judging unit detects the edges at the right and left ends of the image in the main scanning direction.

It is still another object of the present invention to provide a novel image processing apparatus in which the edge judging unit detects the edges at the right and left ends of the image in the main scanning direction in accordance with a signal obtained by smoothing input image data, in order to further improve the image quality at the right and left edges of the image in the main scanning direction.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 14 is a diagram showing a further expansion circuit for expanding right and left edge pixels;

FIG. 15 is a diagram showing a further detection circuit for detecting the right-side and left-side edge pixels by use of a smoothing signal;

DETAILED DESCRIPTION OF THE PREFERRED EMBODIMENT

Figure 1:
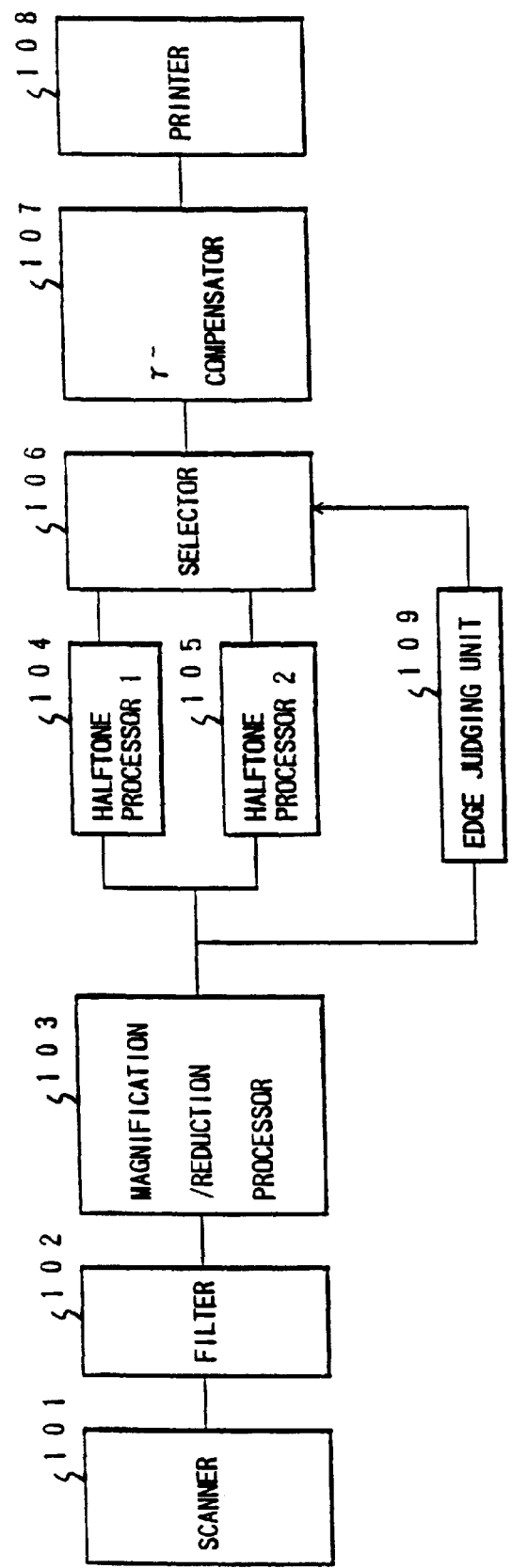
FIG. 1 is a block diagram of a digital copying machine related to an embodiment according to the present invention.

Referring now to the drawings, wherein like reference numerals designate identical or corresponding parts throughout the several views, and more particularly to FIG. 1 thereof, an embodiment of the present invention will now be described.

As shown in FIG. 1, a digital copying machine of the present invention includes a scanner 101 for reading an image of a document and for outputting image information (a digital signal) after A/D conversion, a filter 102 for executing various filter processings on the image information output from the scanner 101, a magnification/reduction processor 103 for practicing magnification/reduction of the image information, a first halftone processor 104 and a second halftone processor 105 each for converting the image information to predetermined multiple data, a selector 106 for switching between selecting one of the outputs of the first and second halftone processors 104 and 105 in accordance with a judging result ot an edge judging portion 109, a γ compensator 107 for practicing γ compensation, a printer 108 for outputting an image onto paper, and the aforementioned edge judging portion 109.

The edge judging processing performed in the edge judging portion 109 is now explained.

Figure 2:
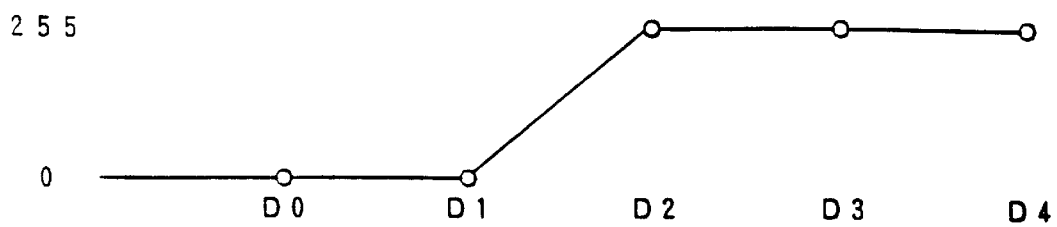
FIG. 2 is an explanatory diagram showing sampling data at a front or left-side edge portion of an image.
Figure 3:
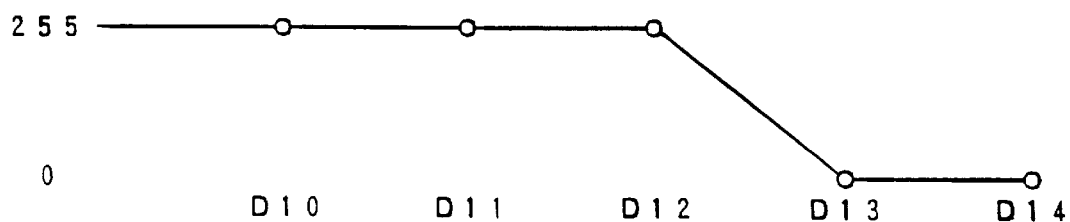
FIG. 3 is an explanatory diagram showing a sampling data at a rear or right-side edge portion of an image.

FIGS. 2 and 3 diagrammatically show a state of sampling data in a main scanning direction at a portion near an edge of an image in a case that there exists an edge of the image traversing the main scanning direction. In FIGS. 2 and 3, the data "0" and "255" signify "White" and "Black" data, respectively. FIG. 2 shows a sampling data row at a left-side of an image, and FIG. 3 shows a sampling data row at a right-side of the image.

Figure 5:
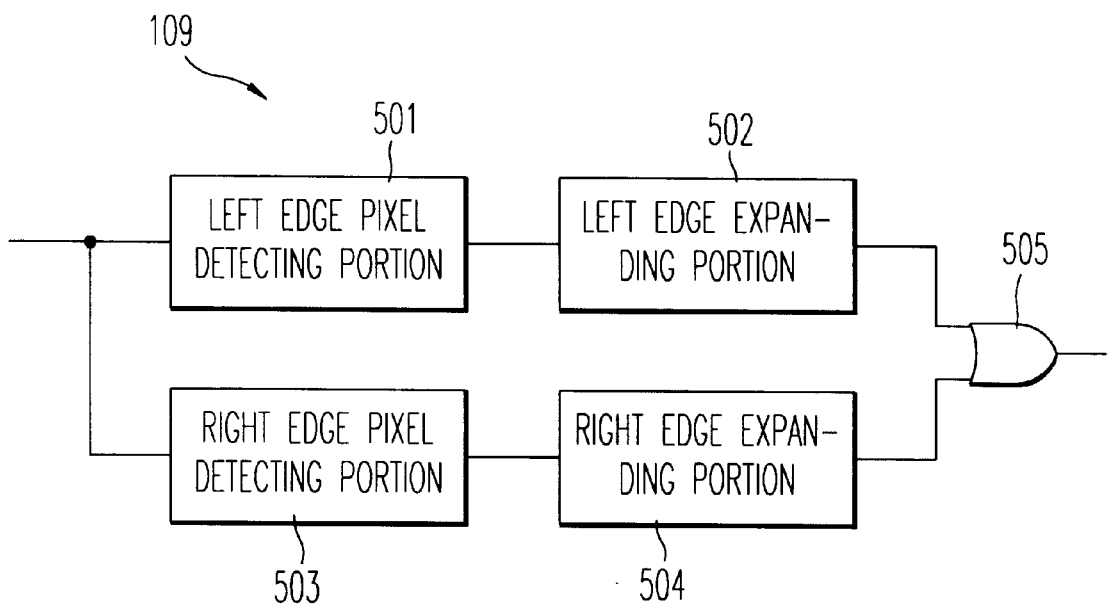
FIG. 5 is a block diagram of an edge judging unit.

The edge judging portion 109 is constructed of, as shown in FIG. 5, a left edge detecting portion 501, a left edge pixel expanding portion 502, a right edge pixel detecting portion 503, a right edge expanding portion 504, and an OR circuit 505.

Initially, detection of an edge pixel is performed by the left edge pixel detecting portion 501 and the right edge pixel detecting portion 503. On occasions of both the right and left edge pixel detections, when a differential density value between pixels immediately before and after a target pixel (a pixel being evaluated to determine if it is an edge pixel) is not smaller than a first threshold value TH1, and the density value of the target pixel is not larger than a second threshold value TH2, the target pixel is determined to be "an edge pixel".

Figure 4:
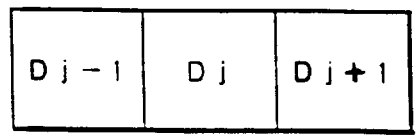
FIG. 4 is an explanatory diagram showing a detected pixel matrix at a time of detecting an edge image.

In FIG. 4 assume that the target pixel is Dj, and the pixels located immediately before and after the target pixel Dj in the main scanning direction are Dj−1 and Dj+1, respectively. Then a judgment inequality of the left edge pixel detection for a character and a line image and that of the right edge pixel detection for the same are, respectively, expressed by the following inequalities (1) and (2):

$$(Dj+1)-(Dj-1)>TH1 \text{ and } Dj<TH2 \quad (1)$$

$$(Dj-1)-(Dj+1)>TH1 \text{ and } Dj<TH2 \quad (2)$$

In the above inequalities, the threshold values TH1 and TH2 in the inequalities (1) and (2) are respectively set such that the white pixel at the boundary portion changing from "white" to "black" is detected at the left edge by satisfying inequality (1) while the white pixel at the boundary portion changing from "black" to "white" is detected at the right edge by satisfying inequality (2). Namely, the pixel D1 is detected as a left edge pixel in FIG. 2, while the pixel D13 is detected as a right edge pixel in FIG. 3.

The left edge expanding portion 502 and the right edge expanding portion 504 in FIG. 5 are now explained.

The left edge expanding portion 502 has an operation to expand a left edge pixel detecting result toward the pixel at a front side in the main scanning direction.

Figure 6:
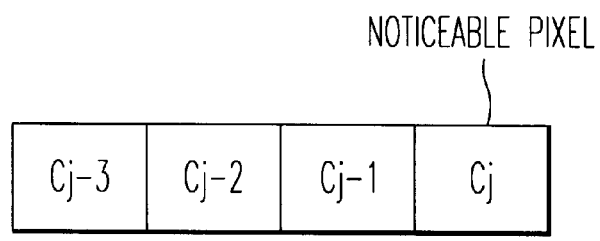
FIG. 6 is an explanatory diagram showing an expanded pixel matrix at a left edge.

As shown in FIG. 6, assuming that the detection results of the target pixel Cj and the three left edge pixels Cj−1, Cj−2, Cj−3 immediately before the target pixel are Cj, Cj−1, Cj−2, and Cj−3, an edge expansion result Elj is expressed by the following equation (3):

$$Elj=Cj \text{ (or) } Cj-1 \text{ (or) } Cj-2 \text{ (or) } Cj-3 \quad (3)$$

Similarly, the right edge expanding portion 504 has an operation to expand a right edge pixel detecting result toward the pixel at a rear side in the main scanning direction.

Figure 7:
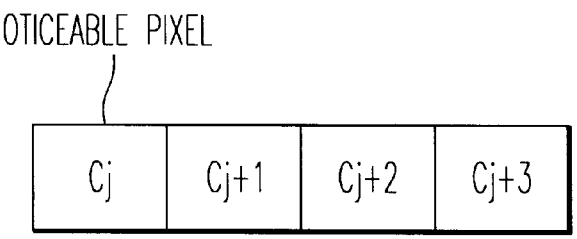
FIG. 7 is an explanatory diagram showing an expanded pixel matrix at a right edge.

As shown in FIG. 7, assuming that the detection results of the target pixel Cj and the three right edge pixels Cj+1, Cj+2, Cj+3 immediately after the target pixel are Cj, Cj+1, Cj+2, and Cj+3, the edge expansion result Erj is expressed by the following equation (4):

$$Erj=Cj \text{ (or) } Cj+1 \text{ (or) } Cj+2 \text{ (or) } Cj+3 \quad (4)$$

In such situations, since the pixel detected as the left- or right-edge pixel is the "white pixel" at the place near the boundary from white to black or from black to white, the left-edge expanding portion 502 performs expansion of the left-edge pixel toward the front-side (preceding) pixels, while the right-edge expanding portion 504 performs expansion of the right-edge pixel toward the rear-side (subsequent) pixels.

Then, the outputs of the left-edge expanding portion 502 and the right-edge expanding portion 504 are input to the OR circuit 505, and the logical sum of the respective outputs is output as a result of the edge judging.

Figure 8:
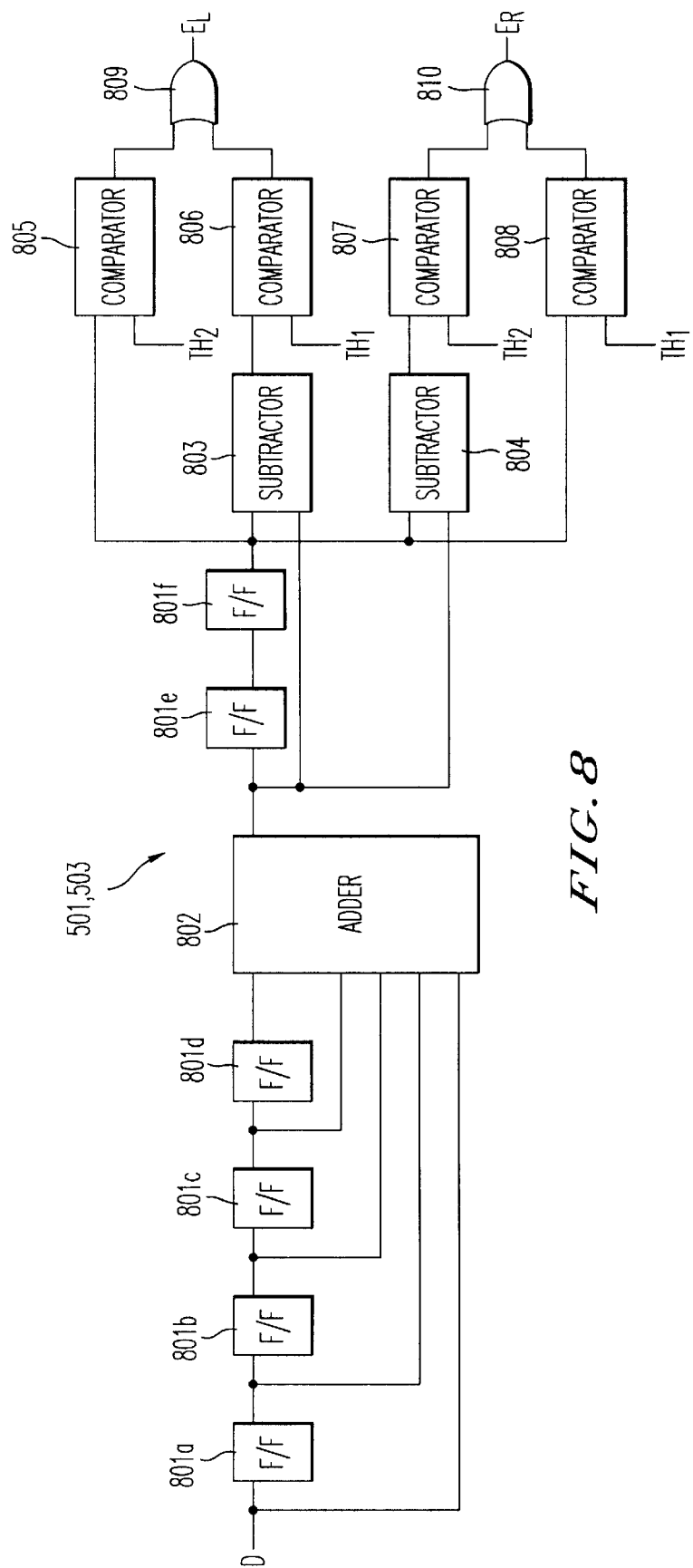
FIG. 8 is a diagram of a circuit for detecting an edge pixel at right and left edges of an image.

FIG. 8 shows a specific construction of a circuit for detecting the left-edge pixel 501 and the right-edge pixel 503.

The image data D input into the detection circuit stores, as an example, data for four consecutive pixels in flip flops 801a through 801d, and five pixels (the four stored pixels and the currently detected pixel) are added in the adder 802, and as a result a smoothed output is obtained. This example shows five pixels being processed, although the number of pixels can be varied.

Then, the image data smoothed by the adder 802 is stored as two pixels in the flip flops 801e and 801f.

The subtracting operation of (Dj+1)−(Dj−1) in the inequality (1) is performed in the subtractor 803, and at the same time the subtracting operation of (Dj−1)−(Dj+1) in the inequality (2) is performed in the subtractor 804. The results of these subtraction operations are then each compared with threshold value TH1 in respective comparators 806 and 807.

And further, the evaluation of Dj<TH2 in the inequality (1) is performed in the comparator 805, and at the same time the evaluation of Dj<TH2 in the inequality (2) is performed in the comparator 808.

Next, the outputs of the comparator 805 and the comparator 806 are input into an AND circuit 809, and the detection as to whether the target pixel is a left-edge pixel is performed by taking the respective logical products. And further, at the same time, the outputs of the comparators 807 and 808 are input into an AND circuit 810, and the detection as to whether the target pixel is a right-edge pixel is performed by taking the respective logical products.

Figure 9:
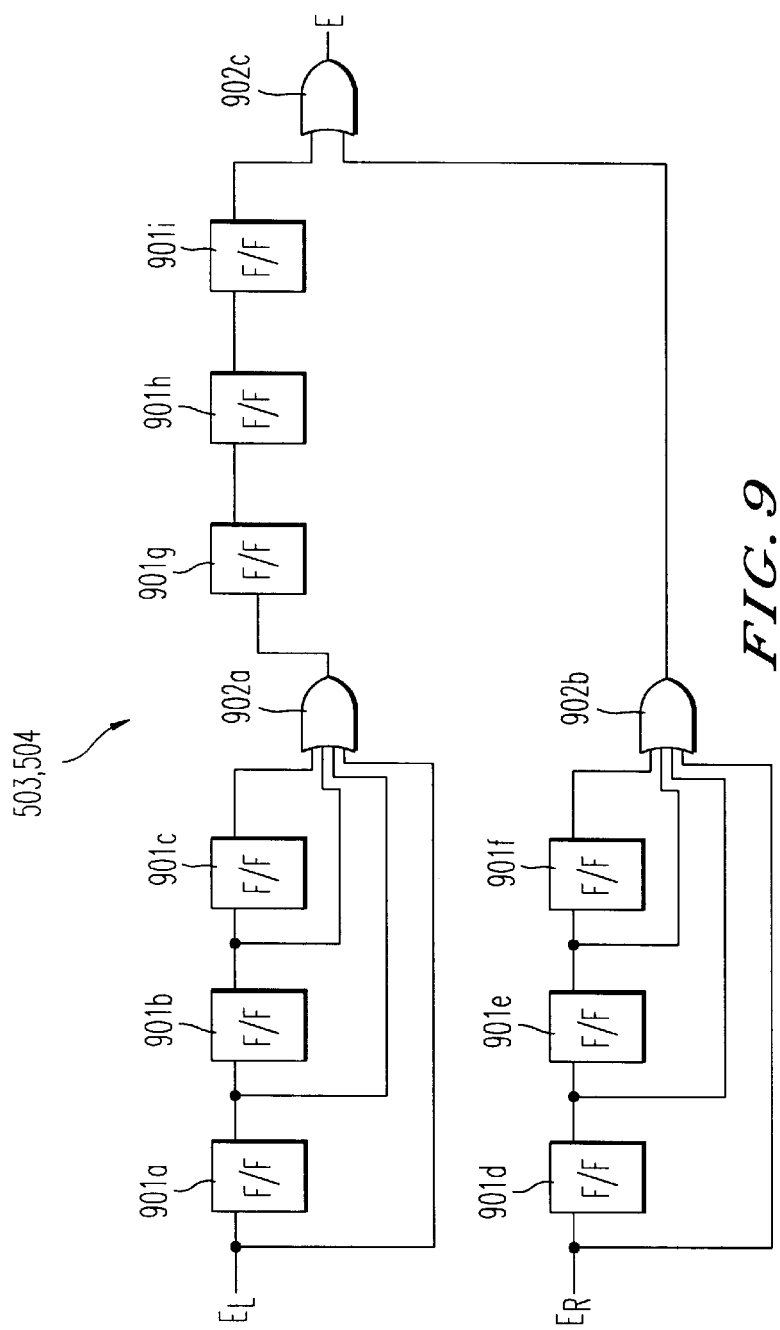
FIG. 9 is a circuit diagram for expanding the image (pixel) at the right and left edges.

A specific construction of the circuit of the right and left edge expanding portions 502, 504 is shown in FIG. 9, in which the left-edge pixel detecting result signal El and the right-edge pixel detecting result signal Er, both of which are the outputs of the circuit shown in FIG. 8, are input therein, and the respective input signals are stored as three pixels in the flip flops 901a–901c and the flip flops 901d–901f. Further, the signals are respectively input into the OR circuit 902a and the OR circuit 902b, and the expanding operation of the edge pixel is performed by taking the logical sum of the respective successive four pixels as noted in equations (3) and (4).

Figure 10:
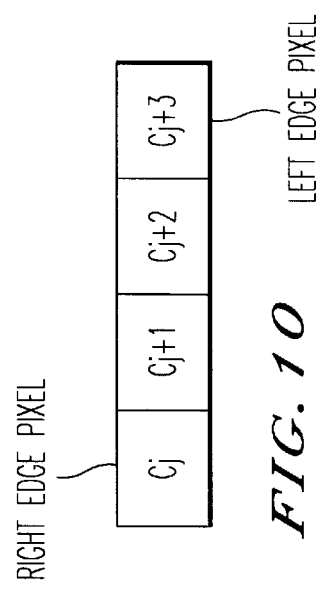
FIG. 10 is an explanatory diagram for explaining a pixel position in a case of detecting the right and left edges.

Further, the left-edge pixel is delayed by three clock cycles by the use of the flip flops 901g–901i as a result of the difference between the expanding directions at the edge expansion of the left-edge pixel and that of the right-edge pixel, and thereby the pixel positions of the left-edge pixel and the right-edge pixel are adjusted and caused to coincide with each other. Thereafter, the judgment of the edge pixel is executed by taking the logical sum with the OR circuit 902c, and thereby the output of the edge judging unit 109 can be obtained. FIG. 10 illustrates the above state. The left-edge expanded pixel EDl created by the left-edge expansion and the right-edge expanded pixel EDr created by the right-edge expansion are respectively expressed by the following inequalities (5) and (6):

$$EDlj+3=Elj \text{ (or) } Elj+1 \text{ (or) } Elj+2 \text{ (or) } Elj+3 \quad (5)$$

$$EDrj=Erj \text{ (or) } Erj+1 \text{ (or) } Erj+2 \text{ (or) } Erj+3 \quad (6)$$

Here, as is apparent from the inequalities (5) and (6), the left-edge expanded pixel Edl advances by three pixels from the right-edge expanded pixel Edr. Therefore, the deviation of the pixel position thus judged is compensated by the flip flops 901g–901i shown in FIG. 9, and thereby the position of the target pixel is adjusted. Thereafter, the edge pixel judgment is performed by taking the logical sum of Edl and Edr by use of the OR circuit 902c.

Figures 16, 18:
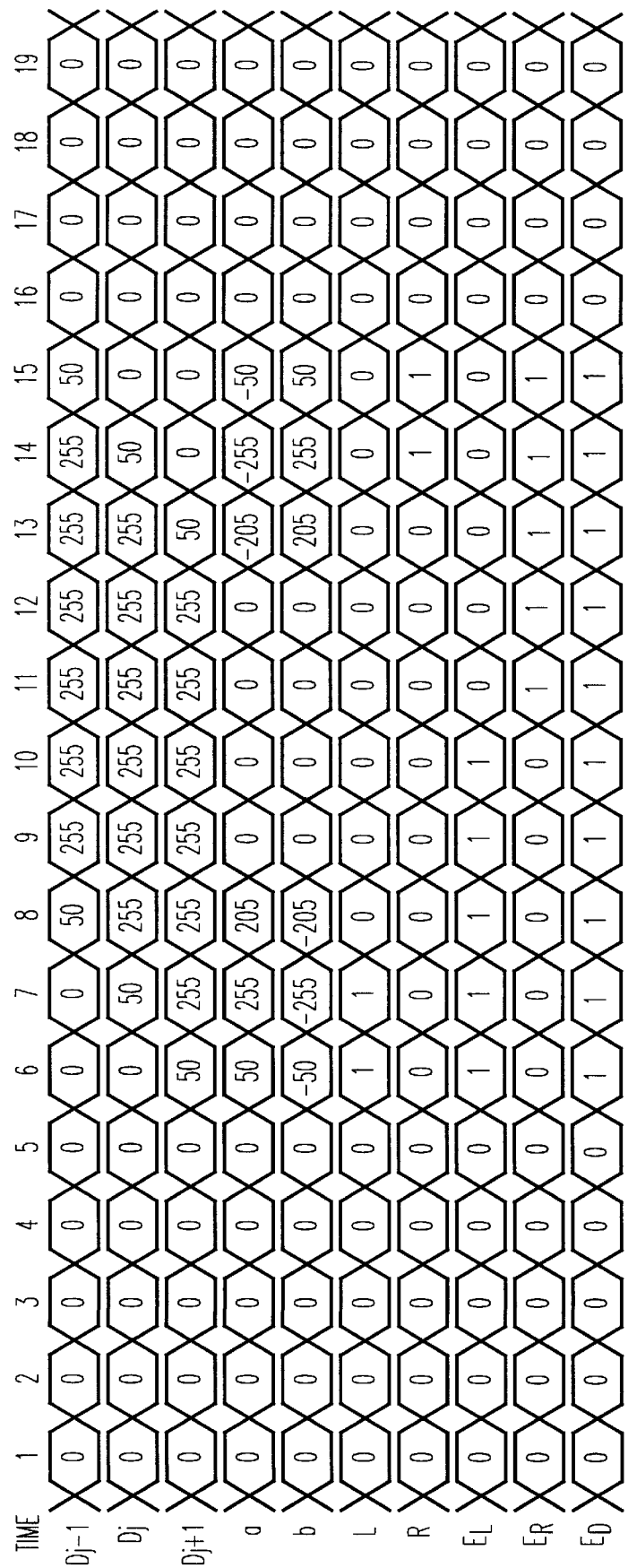
FIG. 16 is a timing chart of an operation in a circuit constructed with the circuit elements shown in FIG. 13 and FIG. 14.
FIG. 18 is an explanatory diagram showing an operation of a selector circuit of the present invention.

The output from one of the first halftone processing portion 104 or from the second halftone processing 105 is selected by the selector 106 and is output therefrom in accordance with the judgment result of the edge judging portion 109, as shown in FIG. 1. The operation of the selector 106 is shown in FIG. 18.

The selector 106 operates such that, when the output of the edge judging unit 109 is in a state of "ON", i.e., one of either the right-edge or left-edge pixel is detected, the selector 106 outputs the signal from the halftone processor 104, and on the other hand, when the output of the edge judging unit 109 is in a state of "OFF", i.e., no edge pixel is detected, the selector 106 outputs the signal from the halftone processor 105. In such a state, the edge judging unit 109 outputs "ON" when the target pixel is an edge pixel, while the edge judging unit 109 outputs "OFF" when the target pixel is not an edge pixel.

The present invention can thus change the halftone processing based on whether on edge pixel is detected or not. In the present invention, the halftone processing portion 104 may output 8 bits of the output signal from the magnification processing portion 103 as it is in order to improve the image quality of the character-line image edge. Thus, halftone processor 104 is able to effectively provide an edge treatment for an edge pixel. And further, according to the embodiment of the present invention, multiple value error diffusion is performed in the second halftone processing portion 105 in order to improve the image quality of the halftone picture or the photograph; which provides adequate processing for a non-edge pixel. Consequently, the performance of reproducing the halftone becomes more superior compared with the output per one pixel unit.

Regarding the aforementioned embodiment thus constructed, in the image processing apparatus having an edge judging unit 109 for judging the presence or absence of the edge pixel for the image data input from the image inputting apparatus, plural halftone processing units 104 and 105 are provided therein, and the halftone processing units 104 and 105 are selected in accordance with the judgment result of the edge judging unit 109. Consequently, the performance of reproducing the image edge can be improved and a preferable image output can be obtained. And further, in the aforementioned embodiment, since the edge judging unit 109 detects the edges at both the right and left end portions of the image in the main scanning direction, the performance of reproducing the image edge at both the right and left end portions of the image is subject to an edge treatment or processing, and thereby a preferable image output can be obtained.

Figure 11:
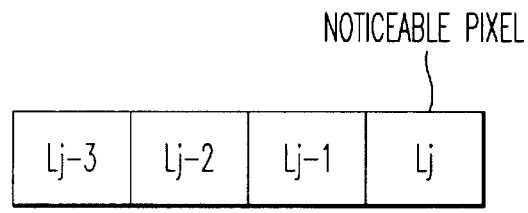
FIG. 11 is a diagram showing a further matrix of a left edge expanding pixel.
Figure 12:
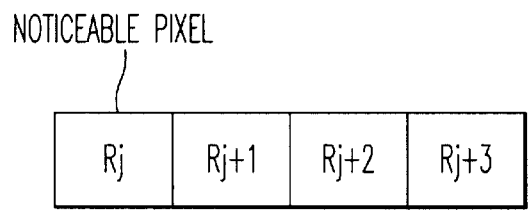
FIG. 12 is a diagram showing a further matrix of a right edge expanding pixel.

FIGS. 11 and 12 are directed to a further embodiment of the present invention. FIG. 11 shows a target pixel similarly as in FIG. 6 in which a left-target pixel Lj and the three preceding pixels Lj−1, Lj−2 and Lj−3 are shown. FIG. 12 is similar to FIG. 7 showing the detection of a right-edge pixel with target pixel Rj and the three subsequent pixels Rj+1, Rj+2 and Rj+3.

Figure 13:
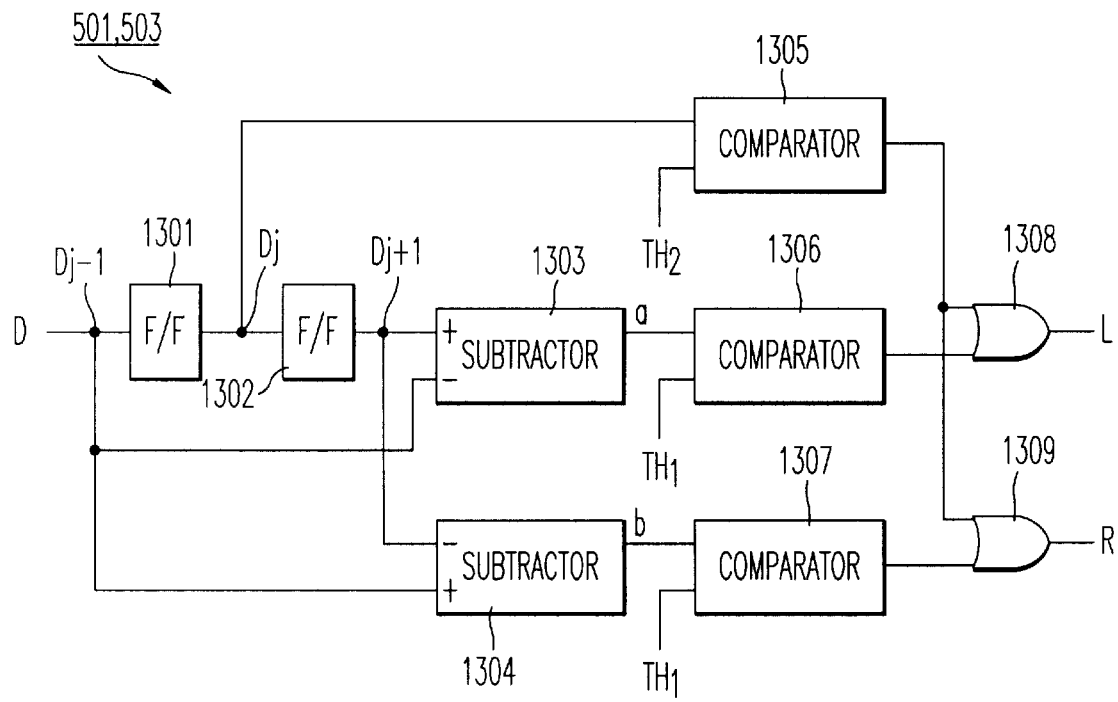
FIG. 13 is a diagram showing a further detection circuit for detecting right-side and left-side edge pixels.

FIG. 13 shows a further embodiment in the present invention of a circuit for performing the operation of the left-edge pixel detecting portion 501 and right-edge pixel detecting portion 503 as shown in FIG. 5. In this further embodiment of the present invention of FIG. 13, the image data D to be input to the detection circuit is stored in the flip flops 1301 and 1302 as two pixels, as an example, and the operation of (Dj+1)−(Dj−1) in the inequality (1) is performed in the subtractor 1303. In a similar way, the operation of (Dj−1)−(Dj+1) in the inequality (2) is performed in another subtractor 1304. And further, the evaluation of Dj<TH2 in the inequalities (1) and (2) is performed in the comparator 1305. On the other hand, the evaluation of (Dj+1)−(Dj−1)>TH1 in the inequality (1) is performed in the comparator 1306 and the evaluation of (Dj−1)−(Dj+1)>TH1 in the inequality (2) is performed in the comparator 1307.

Then, the output signals of the comparators 1305 and 1306 are input to the AND circuit 1308, and the detection as to whether the target pixel is a left-edge pixel is executed by taking the logical product of the respective signals. And further, in a similar way, the output signals of the comparators 1305 and 1307 are input to the AND circuit 1309, and the detection as to whether the target pixel is a right-edge pixel is executed by taking the logical product of the respective signals.

The result signal L of detecting the target pixel as a left-edge pixel and the result signal R of detecting the target pixel as a right-edge pixel, both of which are the outputs of the circuit shown in FIG. 13, are then input to the circuit shown in FIG. 14, and the operation of expansion is performed by the OR circuit for a respective four pixels.

That is, the circuit shown in FIG. 14 is a further embodiment of the present invention which is similar to the circuit shown in FIG. 9 for performing the operation of the left-edge expanding portion 502 and the right-edge expanding portion 504.

The result signal L of detecting the target pixel as a left-edge pixel is stored in the flip flops 1401a–1401c in three pixels, as an example, and are then input to the OR circuit 1402a. The expansion of the left-edge pixel is thereby performed, and the output signal El is then output from OR circuit 1402a. And further, in a similar way, the result signal R of detecting the target pixel as a right-edge pixel is stored in the flip flops 1401d–1401i as six pixels, as an example, and four signals among the six pixels (the outputs of the flip flops 1401f–1401i) are input to the OR circuit 1402b. The expansion of the right-edge pixel is thereby performed, and the output signal Er is output from OR circuit 1402b. And then, by taking the logical sum of the respective output signals El and Er by the OR circuit 1402c, the judgment of the edge pixel is executed in the OR circuit 1402c, and thereby the output ED of the edge judging unit 109 can be obtained in such a manner.

FIG. 15 shows a further embodiment of the present invention of circuitry for performing the operation of the left-edge pixel detection portion 501 and the right-edge pixel detection portion 503. The further embodiments shown in FIG. 15 also allows a further smoothing operation of input pixel data.

More specifically, FIG. 15 shows a specific construction of a circuit for performing the detection of the left-edge pixel and the detection of the right-edge pixel after performing an operation of smoothing an input image signal.

The image data D to be input to the detection circuit of FIG. 15 is initially stored in the flip flops 1501–1504 as four pixels, as an example, and a smoothing operation for five pixels is performed by the smoothing filter 1505. Next, the image data thus smoothed by the smoothing filter 1505 is stored in the flip flops 1301 and 1302 as two pixels, and the operation of (Dj+1)−(Dj−1) in the inequality (1) is performed in the subtractor 1303. Similarly, the operation of (Dj−1)−(Dj+1) in the inequality (2) is performed in the subtractor 1304. And further, the evaluation of Dj<TH2 in the inequalities (1) and (2) is performed in the comparator 1305. The evaluation of (Dj+1)—(Dj−1)>TH1 in the inequality (1) is performed in the comparator 1306, while the evaluation of (Dj−1)−(Dj+1)>TH1 in the inequality (2) is performed in the comparator 1307.

Then, the output signals of the comparators 1305 and 1306 are input to the AND circuit 1308, and thereby the detection as to whether the target pixel is a left-edge pixel is performed by taking the logical product of the respective signals. And further, in a similar way, the output signals of the comparators 1305 and 1307 are input to the AND circuit 1309, and thereby the detection as to whether the target pixel is a right-edge pixel is performed by taking the logical product of the respective signals.

FIG. 16 shows a timing chart of the operation of the circuit constructed with the circuit elements shown in FIG. 13 and FIG. 14. Similarly, FIG. 17 shows a timing chart of the operation of the circuit constructed with the circuit elements shown in FIG. 14 and FIG. 15.

Figure 17:
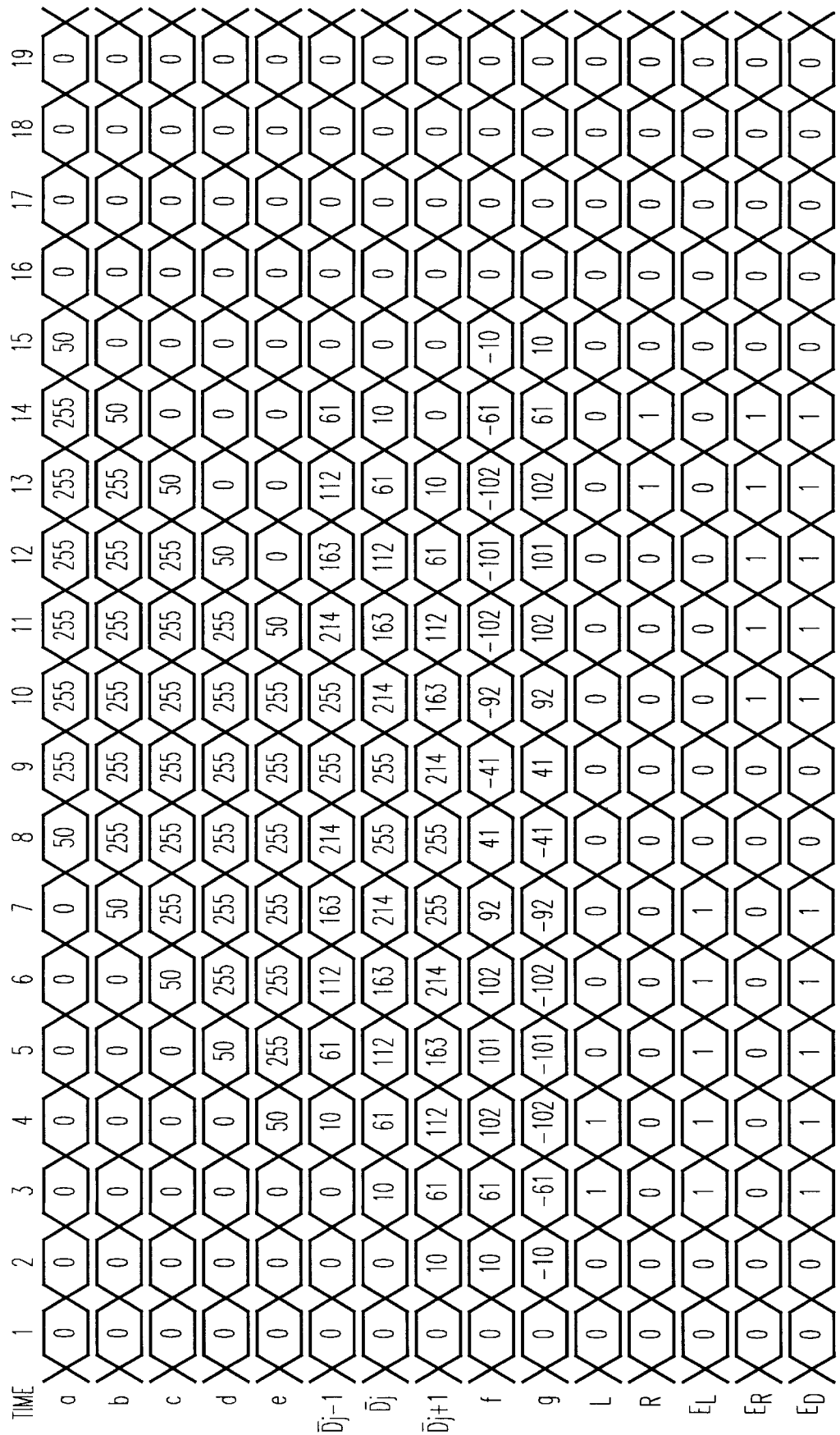
FIG. 17 is a timing chart of an operation in a circuit constructed with the circuit elements shown in FIG. 14 and FIG. 15.

FIG. 16 and FIG. 17 show the states of inputting the signals to the respective circuits in the order of time when the image signal is input from the right side of the manuscript (original) document. The further left the respective signals, the more recent the data are input, and further the more left on the manuscript document that signifies.

The symbols Dj−1, Dj and Dj+1 in FIG. 16, respectively, signify the input data D and the output data of the flip flops 1301 and 1302 shown in FIG. 13.

Here, "0" and "255" in Dj−1, Dj, and Dj+1 represent, respectively, the "white" data and the "black" data, and further, "50" represents an intermediate density at the boundary area (edge) between black and white. Similarly, "a" and "b" are respective output signals of the subtractors 1303 and 1304, and these signals have positive and negative polarities as the calculation results of (Dj+1)−(Dj−1) and (Dj−1)−(Dj+1). Here, since the comparators 1306 and 1307 compare the threshold value TH1 of the positive polarity with the values "a" and "b" of the subtractors 1303 and 1304, it is allowable to eliminate the negative polarity value by clamping only the negative value of the outputs of the subtractors 1303 and 1304 to "0 (zero)" in order to further simplify the circuit.

Furthermore, "L" and "R" are, respectively, the output signals of the AND circuits 1308 and 1309 shown in FIG. 13, and these signals are input to the circuit shown in FIG. 14. Here, assuming that the value of TH1 is 40 and that of TH2 is 80, as examples, in the inequalities (1) and (2), the terminal L becomes an "edge" at the moment of the labeled times 6 and 7 and the value "1" is then output from AND circuit 1308, while the terminal R becomes an "edge" at the moment of the labeled times 14 and 15 and the value "1" is then output from AND circuit 1309.

Next, the left-edge expansion result El and the right-edge expansion result Er are, respectively, the output signals of the OR circuits 1402a and 1402b shown in FIG. 14, and El becomes expanded edges at the labeled times from 6 to 10 and the value "1" is then output from OR circuit 1402a, while Er becomes expanded edges at the labeled times from 11 to 15 and the value "1" is then output from OR circuit 1402b.

Finally, the edge detecting result ED is the output signal of the OR circuit 1402c also shown in FIG. 14, and since the terminal ED outputs the logical sum of El and Er, the signal ED becomes expanded edges at the labeled times from 6 to 15 and the value "1" is then output from OR circuit 1402c.

Similarly, "a" through "e" in FIG. 17 are, respectively, the input data signal and the output data signals of the flip flops 1501 through 1504 as shown in FIG. 15. Next, "Dj−1" is the output signal of the smoothing filter 1505, and the case that all coefficients are ⅕ as shown in the following equality (7) as an example of the filter is illustrated in FIG. 17.

$$\overline{Dj-1} = \tfrac{1}{5} \times (a+b+c+d+e) \tag{7}$$

Furthermore, $\overline{Dj}$ and $\overline{Dj+1}$ are, respectively, the output signals of the flip flops 1301 and 1302. As to the detailed data (right-shifted data), refer to FIG. 17.

The respective output signals "f" and "g" of the subtractors 1303 and 1304 correspond, respectively, to "a" and "b" in FIG. 16, and as to the other respective signals "L", "R", "El", "Er", and "ED", the explanations thereof are omitted, because the operations of the signals are the same as the corresponding signals shown in FIG. 16.

According to the present invention, since an edge judging operation is performed by an edge judging unit for judging the presence or absence of the edge for the image data input from the image inputting apparatus, and the halftone processing operation is changed in accordance with the judgment result, the performance of reproducing the image edge can be improved and a preferable image output can be obtained.

Further, according to the present invention, by detecting the edges at both the right and left end portions of the image in the main scanning direction, the performance of reproducing the image edges at both the right and left end portions of the image can be improved, and a preferable image output can thereby be obtained.

And further, according to the present invention, the edges at both the right and left ends of the image in the main scanning direction may be detected respectively on the basis of signals obtained by smoothing the input image data, and thereby, the reproducibility of the image edges at both the right and left ends of the image can be improved, and thereby preferable image output signals can be obtained.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image processing apparatus comprising:

edge judging means for judging a presence or absence of an edge pixel for input image data, wherein the edge judging means includes a left edge pixel detecting means having an output connected to an input of a left edge expanding means, and a right edge pixel detecting means in parallel with the left edge pixel detecting means, and having an output connected to an input of a right edge expanding means, the left and right edge pixel detecting means receiving the input image data in parallel, wherein said left edge expanding means expands a left edge pixel detecting result toward a pixel at a front side in a main scanning direction and said right edge expanding means expands a right edge pixel detecting result toward a rear side in the main scanning direction, and wherein the edge pixel detecting results are respectively input into an OR circuit and the presence or absence of the edge pixel is based on taking a logical sum of the expanded left edge pixel detecting result, which is delayed based on a difference between expanding directions in the left edge and right edge pixel expanding means, and the expanded right edge pixel detecting result; and plural halftone processing means, wherein one of said plural halftone processing means is selected in accordance with the judgment result of said edge judging means.

2. The image processing apparatus according to claim 1, wherein said plural edge judging means detects edges at both right and left end portions of the input image data in a main scanning direction.

3. The image processing apparatus according to claim 1, wherein said edge judging means performs detection of edges at the right and left ends of the image in the main scanning direction in accordance with a value obtained by smoothing density values of plural pixels in a main scanning direction.

4. A method of processing an image comprising the steps of:

judging a presence or absence of an edge pixel for input image data by an edge judging means, wherein the edge pixel judging step includes substeps of inputting the input image data to a left edge pixel detecting unit having an output connected to an input of a left edge expanding unit, and inputting the input image data to a right edge pixel detecting having an output connected to an input of a right edge expanding unit, the left and right edge pixel detecting units receiving the input image data in parallel, wherein said left edge expanding unit expands a left edge pixel detecting result toward a pixel at a front side in a main scanning direction and said right edge expanding unit expands a right edge pixel detecting result toward a rear side in the main scanning direction, and wherein the edge pixel detecting results are respectively input into an OR circuit and the presence or absence of the edge pixel is based on taking a logical sum of the expanded left edge pixel detecting result, which is delayed based on a difference between expanding directions in the left edge and right edge pixel expanding units, and the expanded right edge pixel detecting result; and selecting one of plural halftone processing means in accordance with the judgment result of said step of edge judging.

5. The method of processing an image according to claim 4, further comprising the step of:

detecting edges at both right and left end portions of the input image data in a main scanning direction by said step of edge judging.

6. The method of processing an image according to in claim 5, further comprising the step of:

detecting edges at the right and left ends of the image in the main scanning direction in accordance with a value obtained by smoothing density values of plural pixels in a main scanning direction.

7. An image processing apparatus comprising:

an edge judging unit for detecting a right edge pixel and a left edge pixel of an input image, wherein the edge judging unit includes a left edge pixel detecting unit having an output connected to an input of a left edge expanding unit, and a right edge pixel detecting unit in parallel with the left edge pixel detecting unit, and having an output connected to an input of a right edge expanding unit, the left and right edge pixel detecting units receiving the input image data in parallel, wherein said left edge expanding unit expands a left edge pixel detecting result toward a pixel at a front side in a main scanning direction and said right edge expanding unit expands a right edge pixel detecting result toward a rear side in the main scanning direction, and wherein the edge pixel detecting results are respectively input into an OR circuit and the presence or absence of the edge pixel is based on taking a logical sum of the expanded left edge pixel detecting result, which is delayed based on a difference between expanding directions in the left edge and right edge pixel expanding units, and the expanded right edge pixel detecting result; and first and second halftone processing circuits, wherein the input image is processed by the first halftone processing circuit when either a right or left edge pixel is detected by the edge judging unit, and wherein the input image is processed by the second halftone processing circuit when no edge pixel is detected by the edge judging unit.

8. The image processing apparatus according to claim 7, wherein the left edge expanding unit expands the detected left edge pixel in a direction preceding the left edge pixel in a main scanning direction, and the right edge expanding unit expands the detected right edge pixel in a direction subsequent the right edge pixel in the main scanning direction.

9. The image processing apparatus according to claim 7, wherein the left and right edge pixels are detected by comparing relationships of pixels preceding and subsequent to a target pixel with a first predetermined threshold value, and by comparing the target pixel with a second predetermined threshold value.

10. The image processing apparatus according to claim 8, wherein the left and right edge pixels are detected by comparing relationships of pixels preceding and subsequent to a target pixel with a first predetermined threshold value, and by comparing the target pixel with a second predetermined threshold value.

11. The image processing apparatus according to claim 7, wherein the edge judging unit comprises means for smoothing pixels of the input image in a main scanning direction.

12. An edge judging unit comprising:

means for detecting a left edge pixel of an input image;

means for detecting a right edge pixel of an input image;

wherein the means for detecting the left edge pixel includes a left edge pixel detecting unit having an output connected to an input of a left edge expanding unit, and the means for detecting the right edge pixel includes a right edge pixel detecting unit in parallel with the left edge pixel detecting unit, and having an output connected to an input of a right edge expanding unit, the left and right edge pixel detecting units receiving the input image data in parallel; and wherein said left edge expanding unit expands a left edge pixel detecting result toward a pixel at a front side in a main scanning direction and said right edge expanding unit expands a right edge pixel detecting result toward a rear side in the main scanning direction, and wherein the edge pixel detecting results are respectively input an OR circuit and the presence or absence of the edge pixel is based on taking a logical sum of the expanded left edge pixel detecting result, which is delayed based on a difference between expanding directions in the left edge and right edge pixel expanding units, and the expanded right edge pixel detecting result.

13. The edge judging unit according to claim 12, wherein the left and right edge detecting units compare relationships of pixels preceding and subsequent to a target pixel with a first predetermined threshold value, and compare the target pixel with a second predetermined threshold value.

14. The edge judging unit according to claim 12, further comprising means for smoothing pixels of the input image in a main scanning direction.

* * * * *